US008696468B2

(12) United States Patent
Layne, IV

(10) Patent No.: US 8,696,468 B2
(45) Date of Patent: Apr. 15, 2014

(54) AMUSEMENT DEVICE INCLUDING PROVISION FOR TRACKING A PLAYER'S TOP SCORE

(75) Inventor: William L. Layne, IV, Langhorne, PA (US)

(73) Assignee: AMI Entertainment Network, LLC, Wilmington, DE (US)

( * ) Notice: Subject to any disclaimer, the term of this patent is extended or adjusted under 35 U.S.C. 154(b) by 0 days.

(21) Appl. No.: 13/563,816

(22) Filed: Aug. 1, 2012

(65) Prior Publication Data
US 2013/0035161 A1 Feb. 7, 2013

Related U.S. Application Data

(60) Provisional application No. 61/515,162, filed on Aug. 4, 2011.

(51) Int. Cl.
*A63F 13/12* (2006.01)
(52) U.S. Cl.
USPC .............................................. 463/42; 463/43
(58) Field of Classification Search
USPC .......................................................... 463/42
See application file for complete search history.

(56) References Cited

U.S. PATENT DOCUMENTS

| | | | |
|---|---|---|---|
| 4,856,787 A | 8/1989 | Itkis | |
| 5,575,717 A | 11/1996 | Houriet, Jr. et al. | |
| 5,743,799 A | 4/1998 | Houriet, Jr. et al. | |
| 6,174,236 B1 * | 1/2001 | Tsuda et al. | 463/41 |
| 6,745,236 B1 | 6/2004 | Hawkins et al. | |
| 7,291,067 B2 | 11/2007 | Tarantino | |
| 7,679,487 B1 | 3/2010 | Smith et al. | |
| 7,787,972 B2 | 8/2010 | Schlottmann et al. | |
| 7,798,905 B2 | 9/2010 | Thompson et al. | |
| 7,824,267 B2 | 11/2010 | Cannon et al. | |
| 7,828,661 B1 * | 11/2010 | Fish et al. | 463/42 |
| 7,841,939 B2 | 11/2010 | Baerlocher et al. | |
| 7,914,370 B2 | 3/2011 | Weller | |
| 8,012,009 B2 | 9/2011 | Iddings et al. | |
| 8,016,677 B2 | 9/2011 | O'Kelley, II et al. | |
| 2006/0089200 A1 * | 4/2006 | Twerdahl | 463/42 |
| 2006/0121989 A1 * | 6/2006 | O'Kelley et al. | 463/42 |

(Continued)

OTHER PUBLICATIONS

"Game Center". From apple.com via The Way Back Machine (www.archive.org). [online], [retrieved on Jun. 28, 2013]. Retrieved from the Internet <URL: http://web.archive.org/web/20100905050539/http://www.apple.com/game-center/>. 3 pages.*

(Continued)

*Primary Examiner* — Lawrence Galka
(74) *Attorney, Agent, or Firm* — Panitch Schwarze Belisario & Nadel LLP

(57) ABSTRACT

A method of tracking electronic game score information for a plurality of players participating in an amusement system is disclosed. The amusement system includes at least one amusement device communicating with a central server over a network. The amusement device has a display, a memory storing a plurality of electronic games and a controller. The central server maintains a plurality of player accounts corresponding to the plurality of players. Each of the player accounts includes best score information for at least one of the plurality of electronic games played by the respective player on the amusement device. The central server receives score update information associated with the player accounts from the amusement device and updates the player accounts with the received score update information.

20 Claims, 12 Drawing Sheets

(56) References Cited

U.S. PATENT DOCUMENTS

| | | | |
|---|---|---|---|
| 2007/0072678 A1 | 3/2007 | Dagres | |
| 2007/0207852 A1 | 9/2007 | Nelson et al. | |
| 2007/0293292 A1 | 12/2007 | Gipp et al. | |
| 2008/0113805 A1* | 5/2008 | David et al. | 463/42 |
| 2009/0069091 A1* | 3/2009 | Yamamoto | 463/42 |
| 2009/0186699 A9* | 7/2009 | Kelly | 463/42 |
| 2009/0298593 A1* | 12/2009 | Kobayashi et al. | 463/42 |
| 2010/0113162 A1 | 5/2010 | Vemuri et al. | |
| 2011/0045912 A1* | 2/2011 | Bortnik et al. | 463/42 |
| 2011/0065511 A1* | 3/2011 | Mahan et al. | 463/40 |
| 2011/0111815 A1 | 5/2011 | Sediq | |
| 2011/0111855 A9 | 5/2011 | Hardy et al. | |
| 2011/0218033 A1 | 9/2011 | Englman et al. | |
| 2011/0250968 A1* | 10/2011 | Os et al. | 463/42 |
| 2012/0225723 A1* | 9/2012 | Webster et al. | 463/42 |

OTHER PUBLICATIONS

"iPad User Guide for iOS 4.2 Software". From apple.com via The Way Back Machine (www.archive.org). [online], [retrieved on Jun. 28, 2013]. Retrieved from the Internet <URL:http://web.archive.org/web/20110411194940/http://manuals.info.apple.com/en_US/iPad_iOS4_User_Guide.pdf>. pp. 1, 2, 5, 119-125. 11 pages.*

"Game Center for iOS: Understanding Apple's New Video Game Matchmaking + Tracking App". From ilounge.com via The Way Back Machine (www.archive.org). [dated Sep. 17, 2010]. [online], [retrieved on Jul. 1, 2013]. Retrieved from the Internet.* <URL:http://web.archive.org/web/20100918055829/http://www.ilounge.com/index.php/articles/comments/game-center-for-ios-understanding-apples-new-video-game-matchmaking-trackin/>. 11 pages.*

"Top 10 iPhone games with Game Center support". From pocketgamer.co.uk via The Way Back Machine (www.archive.org). [online], [retrieved on Jun. 29, 2013]. Retrieved from the Internet <URL:http://web.archive.org/web/20101017003749/http://www.pocketgamerco.uk/r/iPhone/Game+Center/feature.asp?c=24151>. 4 pages.*

"Fruit Ninja Now Has Full Game Center Support With Leaderboards and Achievements". From from appadvice.com via The Way Back Machine (www.archive.org). [dated Sep. 29, 2010]. [online], [retrieved on Jun. 29, 2013]. Retrieved from the Internet.* <URL:http://web.archive.org/web/20101002144052/http://appadvice.com/appnn/2010/09/fruit-ninja-full-game-center-support-leaderboards-achievements/>. 2 pages.* http://code.google.com/p/high-score/, printed on Aug. 15, 2012, 1 page.

* cited by examiner

AMUSEMENT DEVICE INCLUDING PROVISION FOR TRACKING A PLAYER'S TOP SCORE

CROSS-REFERENCE TO RELATED APPLICATIONS

This application claims the benefit of U.S. Provisional Patent Application No. 61/515,162, filed on Aug. 4, 2011 and entitled "Amusement Device Including Provision for Tracking a Player's Top Score", the entire contents of which are incorporated herein by reference in its entirety

BACKGROUND OF THE INVENTION

Preferred embodiments of the present invention relate generally to electronic amusement devices and systems. More particularly, preferred embodiments of the present invention are directed to an amusement system having player accounts for storing a player's best scores for games playable on the amusement system.

Amusement devices having electronic games for computers and touchscreens or other types of amusement devices are generally known in the art. Amusement devices, such as game machines, which allow a player to select games from a video display are known in the art, such as those disclosed in U.S. Pat. No. 4,856,787 ("Itkis"), U.S. Pat. No. 5,575,717 ("Houriet, Jr., et al."), and U.S. Pat. No. 5,743,799 ("Houriet, Jr., et al."), each of which is incorporated by reference and shows a touchscreen for making a game selection from a menu of games. Such game machines or amusement devices typically operate upon input of currency (i.e., coin, token, paper money, credit/debit cards or the like) and are installed in locations such as bars, restaurants, airports, shopping malls, video arcades, casinos, or the like. The game choices may include card games, sports games, games of skill, games of chance, action games, trivia games, or the like. Typically, the goal of such games is for the player to amass the highest possible score.

Previously, amusement devices maintained only a select number of the overall highest scores for the game on a machine-specific leaderboard. Often, the leaderboard only maintained the top ten overall scores achieved on the machine since the leaderboard was last reset, regardless of the player. Even when a player's best score appeared on a leaderboard of a first amusement device, when the player accessed a second amusement device, he could not easily compare his previous best score with any newly achieved scores. Compounding the problem is that leaderboards stored only on amusement devices are often reset. Operators often reset best scores on amusement devices to encourage higher turnover of players appearing on the leaderboards. In addition, external events such as power interruptions can result in the leaderboard being reset.

It is, therefore, desirable to provide an amusement system capable of tracking a player's top scores for a plurality of electronic games across a plurality of amusement devices, so that a player's top score information can be easily retrieved regardless of the amusement device the player is playing.

BRIEF SUMMARY OF THE INVENTION

In one preferred embodiment of the present invention, a method of tracking electronic game score information for a plurality of players participating in an amusement system is disclosed. The amusement system includes at least one amusement device communicating with a central server over a network. The amusement device has a display, a memory storing a plurality of electronic games and a controller. The central server maintains a plurality of player accounts corresponding to the plurality of players. Each of the player accounts includes best score information for at least one of the plurality of electronic games played by the respective player on the amusement device. The central server receives score update information associated with the player accounts from the amusement device and updates the player accounts with the received score update information.

In another preferred embodiment of the present invention, a method of tracking a first player's best score information for a plurality of electronic games played by the first player on a plurality of amusement devices is disclosed. Each of the amusement devices has a display, a memory and a controller. The first amusement device receives log-in information from the first player. The log-in information is associated with the first player's player account stored by a central server. The first player's player account data, including best score information, is received by the first amusement device from the central server. Updates to the first player's player account are transmitted by the first amusement device to the central server. The update comprises new best score information generated based on the first player playing one or more of the plurality of electronic games on the first amusement device.

In yet another preferred embodiment of the present invention, a method of tracking score information over a network in an amusement system is described. The amusement system includes a plurality of amusement devices connected to a central server over a network. Each amusement device has a display, a memory and a controller. The central server maintains a plurality of player accounts corresponding to a plurality of players in a memory. Each of the player accounts store the respective player's best score information for at least one electronic game playable on the amusement devices. The central server receives score information associated with a first player account from a first amusement device, over the network. The score information is determined based on receipt of scoring values from the amusement device at the central server. The scoring values are associated with game play on one or more of the plurality of electronic games by a first player associated with the first player account. The central server updates the first player account with the received score information. When the central server receives a log-in request associated with the first player account from a second amusement device, it transmits the updated first player account to the second amusement device in response to verifying the log-in request.

In another aspect, a preferred embodiment of the present invention is directed to a method of tracking electronic game score information for a plurality of players including a first player and a second player participating in an amusement system. The amusement system includes a first amusement device and a second amusement device communicating with a central server over a network. The first and second amusement devices both having a video display, a memory storing a plurality of electronic games and a controller. The method includes maintaining, by the central server, a plurality of player accounts corresponding to the plurality of players. The plurality of player accounts includes a first player account associated with the a first player. The first player account includes first best score information. The plurality of electronic games includes a first maximum points game and a first head-to-head game. The first best score information includes a first high score for the first maximum points game and a first lifetime win-loss record for the first head-to-head game. First score update information associated with the first player account is received by the central server. The first best score information is compared by the central server with the received first score update information. A game listing of the plurality of electronic games including the first maximum points game and the first head-to-head game and a best score listing of the first best score information is displayed by the video display. The first maximum points game is positioned proximate the first high score and the first head-to-head game is positioned proximate the first lifetime win-loss record in the display.

In yet another aspect, a preferred embodiment of the present application is directed to a method of tracking first best score information of a first player for a plurality of electronic games played by the first player on a plurality of amusement devices including a first amusement device. The plurality of amusement devices connected via a central server. Each of the plurality of amusement devices having a display, a memory and a controller. The method includes receiving first log-in information associated with the first player and a first player account at the first amusement device. The first player account is stored by the central server. The first player account is receiving, by the first amusement device, the from the central server. The first player account includes first best score information. The first best score information has a first high score associated with a first maximum points game, a second high score associated with a second maximum points game and a first lifetime win-loss record associated with a first head-to-head game. An update to the first player account is transmitted by the first amusement device to the central server. The update includes first new best score information generated based on the first player playing one or more of the plurality of electronic games on the first amusement device. A game listing of the plurality of electronic games and a first best score listing of the first new best score information is displayed on a first video display of the first amusement device. The first high score is positioned proximate the first maximum points game, the second high score is positioned proximate the second maximum points game and the first lifetime win-loss record is positioned proximate the first head-to-head game.

In an additional aspect, a preferred embodiment of the present invention is directed to an amusement system for tracking game score information over a plurality of amusement devices for a plurality of players including a first player participating in game play. The amusement system includes a plurality of games available for game play including a first maximum points game and a first head-to-head game and a plurality of player accounts associated with the plurality of players including a first player account associated with the first player. The first player account includes first best score information. The first best score information includes a first high score for the first maximum points game and a first lifetime win-loss record for the first head-to-head game. A central server stores the plurality of electronic games and the plurality of player accounts. The central server configured to receive first score update information associated with the first player account from a first amusement device of the plurality of amusement devices and access the first player account. The first score update information includes a first attained high score associated with the first maximum points game, a first attained win value and a first attained loss value. The central server is also configured to compare the first score update information with the first best score information including comparing the first attained high score with the first high score and the first attained win and loss values with the first lifetime win-loss record.

BRIEF DESCRIPTION OF THE SEVERAL VIEWS OF THE DRAWINGS

The foregoing summary as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

DETAILED DESCRIPTION OF THE INVENTION

Figure 1A:
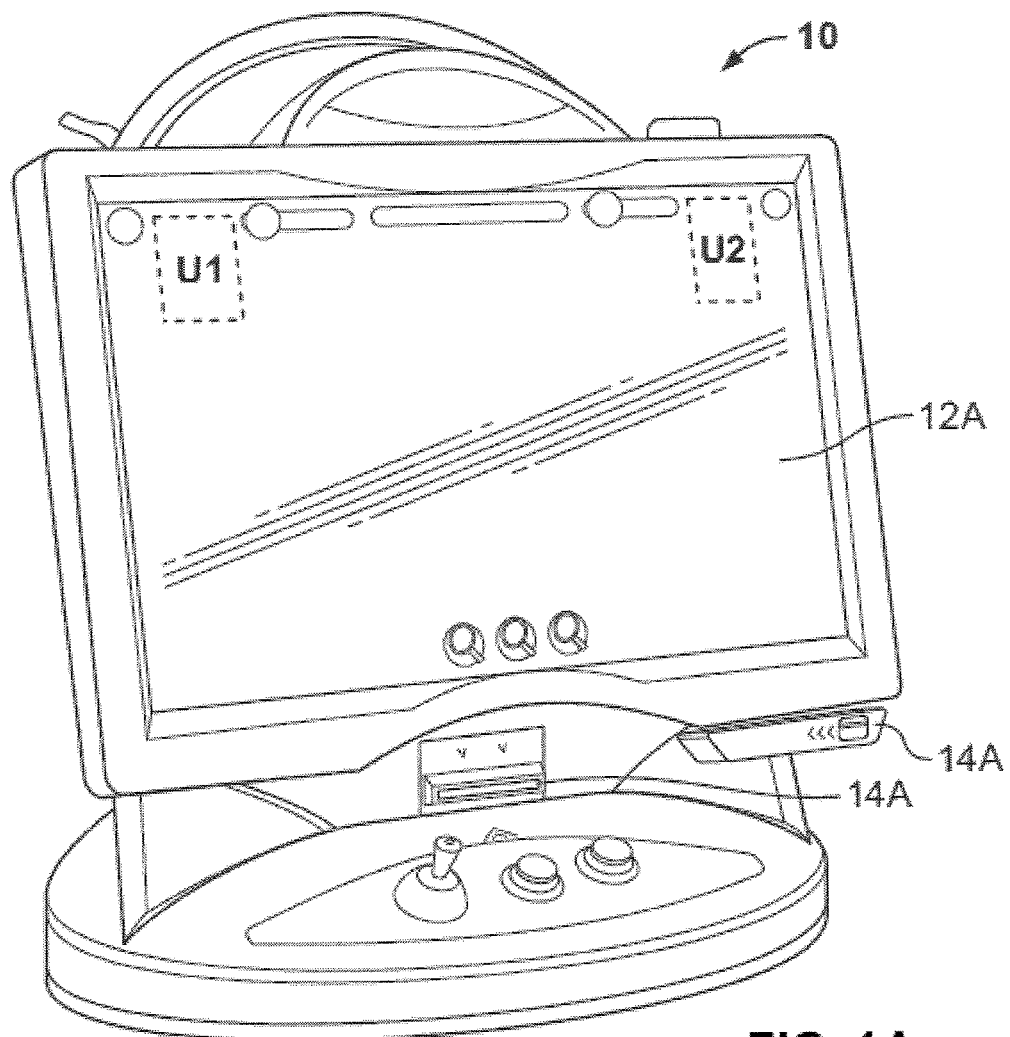
FIG. 1A is a front perspective view of an amusement device in accordance with a first preferred embodiment of the present invention.

Certain terminology is used in the following description for convenience only and is not limiting. The words "right", "left", "lower", and "upper" designate directions in the drawings to which reference is made. The words "inwardly" and "outwardly" refer to directions toward and away from, respectively, the geometric center of the amusement device and designated parts thereof. The terminology includes the above-listed words, derivatives thereof, and words of similar import. Additionally, the words "a" and "an", as used in the claims and in the corresponding portions of the specification, mean "at least one." Further, the terms "coin" or "currency" should not be construed as limiting and can be used herein to mean all forms of coin and paper currency from any country as well as proprietary tokens, game cards, credit cards, debit cards, chits, or other representative forms of credit and/or payment.

Figure 1B:
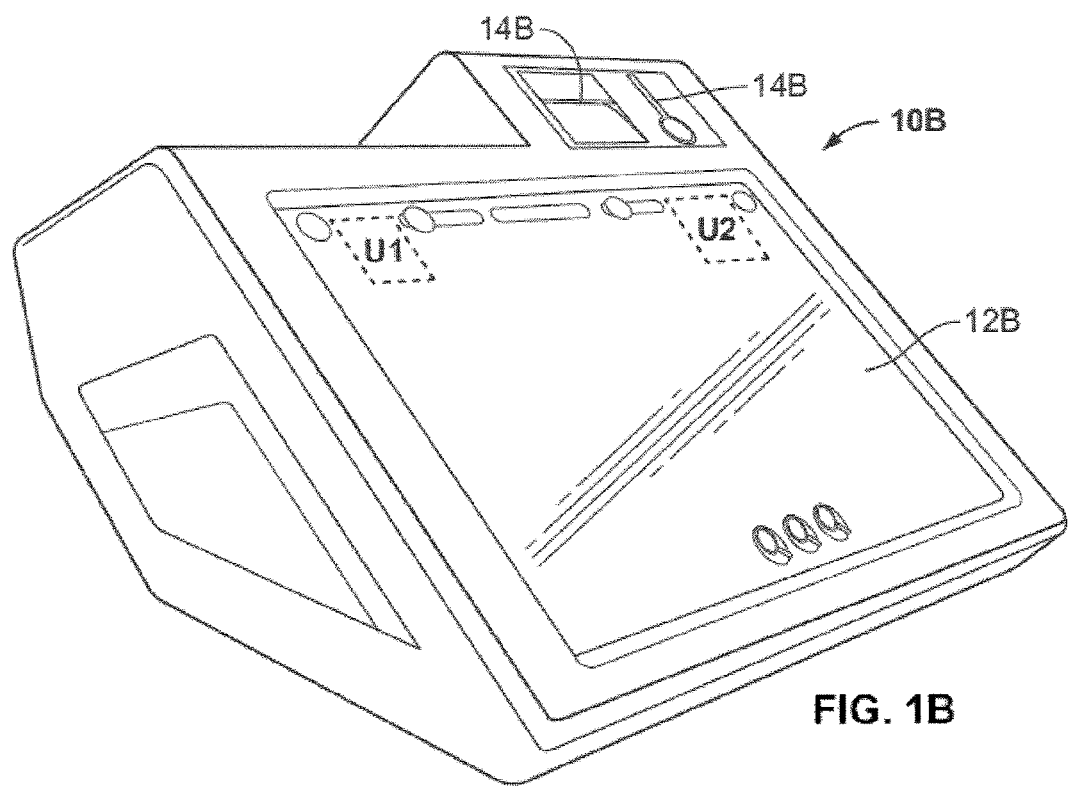
FIG. 1B is a front perspective view of an amusement device in accordance with a second preferred embodiment of the present invention.
Figure 1C:
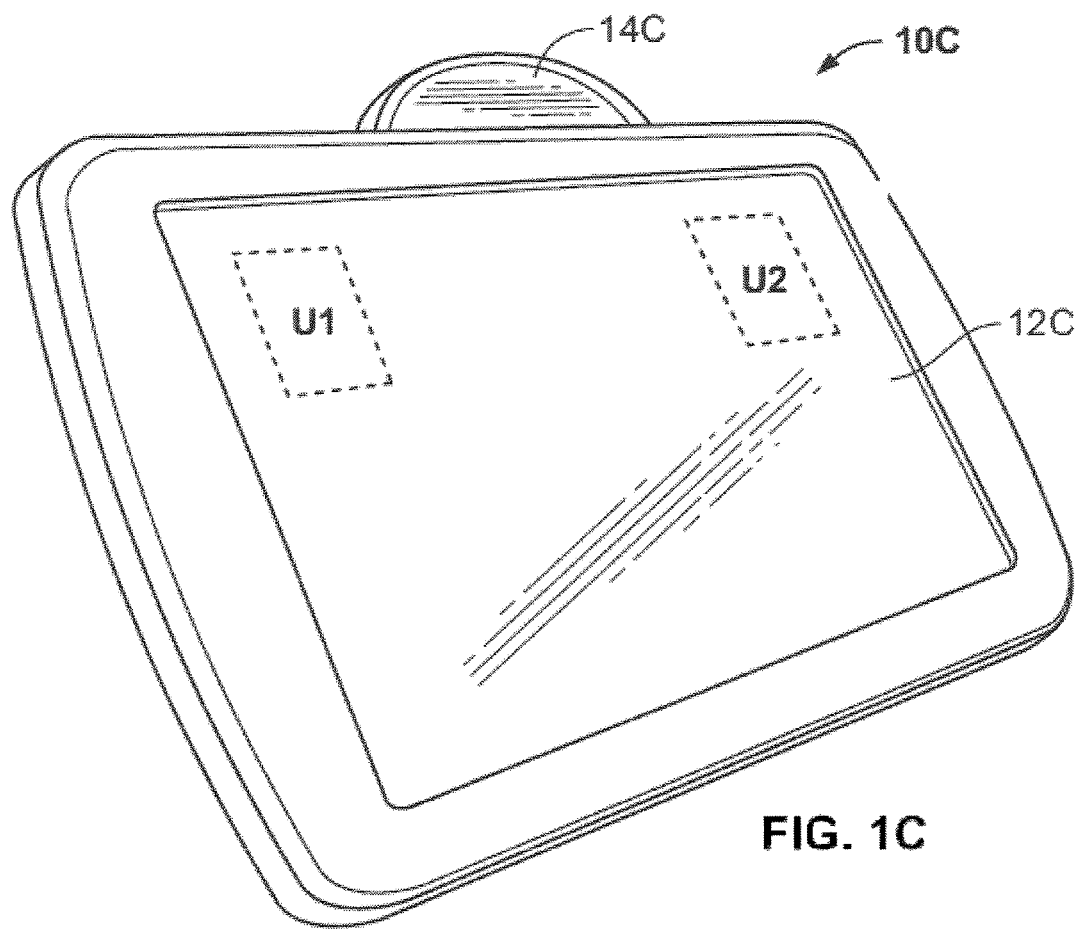
FIG. 1C is a front perspective view of an amusement device in accordance with a third preferred embodiment of the present invention.
Figure 2:
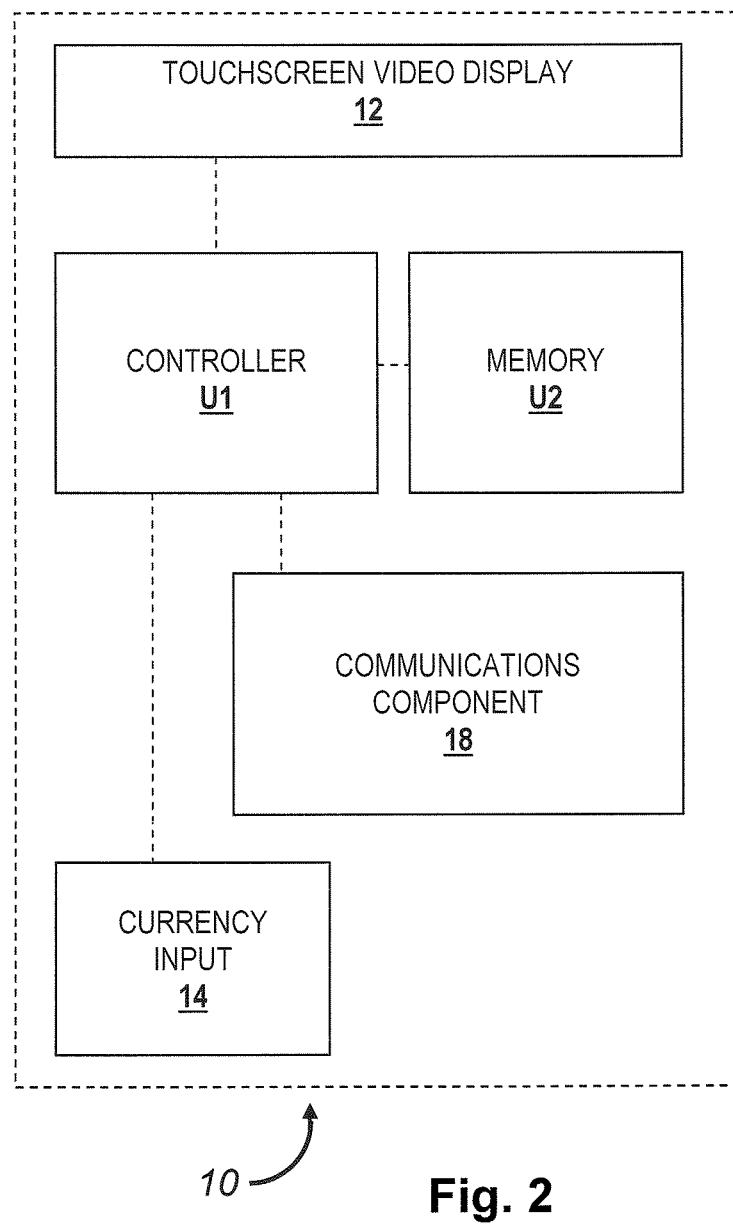
FIG. 2 is a schematic block diagram of a preferred amusement device including a credit card transaction terminal that may be associated with any of the first, second and third preferred embodiments of the present invention of FIGS. 1A-1C.

Referring to the FIGS. 1A-2, wherein like reference numerals indicate like elements throughout, there is shown in FIG. 1A a first preferred embodiment of an amusement device 10A. The amusement device 10A includes a controller U1 and a memory U2. The memory U2 can be any known or suitable memory device such as random access memory ("RAM"), read only memory ("ROM"), flash RAM, hard disk, optical disk, or the like. The amusement device 10A further includes a video display 12A that is operatively connected to the controller U1. The amusement device 10A is preferably a counter-top or table-top apparatus, but may be arranged in any configuration, such as free-standing, floor-standing, table mount, wall mount, pole mount, portable and the like without departing from the preferred invention.

The amusement device 10A also includes at least one input component 14A that receives value in order to establish one or more playable credits. The value received may be at least one of currency, coins, tokens, chits, credits, credit cards/debit cards or the like. Although two input components 14A are shown, the amusement device 10A may include any number of input components 14A to give a player an option for payment, for permitting multiple players, or the like. Preferably, the amusement device 10A is made operable upon actuation of the input component 14A, for example, the player may only select and play an electronic game once value is received at the input component 14A and/or one or more playable credits are issued to the player. However, free selections may be offered at the discretion of an operator of the amusement device 10A.

Referring to FIG. 1B, another or a second amusement device 10B in accordance with a second preferred embodiment of the present invention includes a controller U1, a memory U2, a video display 12B, and at least one input component 14B. Preferably, the video displays 12A, 12B are touchscreen video displays configured to accept touch input.

Referring to FIG. 1C, yet another or a third amusement device 10C, which is designed and configured as a portable amusement device 10C, in accordance with a third preferred embodiment of the present invention, includes a controller U1, memory U2, a display 12C, and at least one input component 14C. The third, preferably portable amusement device 10C is preferably battery-powered. The third amusement device 10C is preferably usable with a docking station (not shown). The docking station preferably secures the device 10C until access is required by an operator or is paid for by a player.

Release from the docking station may occur via an entry through the input component 14C, which is preferably a card reader. The docking station may also provide battery recharging and other services to the amusement device 10C.

The input components 14A, 14B, 14C may be comprised of the touchscreen displays 12A, 12B, 12C in the preferred embodiments. For example, the touchscreen displays 12A, 12B, 12C may be utilized to input player names and/or passwords that permits a player to access a player account associated with the amusement device 10A, 10B. 10C. The player account may be store user credits that can be utilized to start game play.

For convenience, the amusement devices 10A, 10B, 10C will be referred to hereinafter simply as "amusement device 10," the displays 12A, 12B, 12C will be referred to hereinafter simply as "display 12," and the input components 14A, 14B, 14C will be referred to hereinafter simply as "input component 14."

Turning now to the operation of the amusement device 10, the memory U2 preferably stores one or more application programs, such as electronic games, a music or video jukebox program, or the like, and a system control program. However, the one or more application programs may also be stored remotely, for example on a server which communicates with the amusement device 10. For example, the memory U2 may store a subset of a plurality of electronic games that are available in an amusement system, wherein a plurality of amusement devices 10 are connected or networked together. The controller U1 controls the touchscreen display 12 based upon the system control program retrieved from the memory U2 and based upon inputs from the touchscreen display 12. As used herein, the system control program refers to all of the software functions outside of the application program files including an operating system, device profile, display control, input control, sound drivers, and the like. Other input devices which may be connected to the amusement device 10 include a pushbutton(s), a trackball or touchpad, a mouse, a joy-stick, a foot-pedal, a voice recognition system, a keypad or keyboard, and the like. But, preferably, the input device is the touchscreen display 12.

FIG. 2 is a block schematic diagram of the amusement device 10 described above. The touchscreen display 12 is coupled to the controller U1. Also coupled to the controller U1 is a currency input 14. The currency input 14 may accept at least one of coins (or tokens), currency (e.g. paper money or the like), credit cards/debit cards, and the like. Although only one currency input 14 is shown, the amusement device 10 may include more than one input component 14 to give a player an option for payment, for permitting multiple players, or the like. Preferably, the amusement device 10 is made operable upon payment by a player, which may optionally be received via the currency input 14.

The amusement device 10 also preferably includes a communications component 18, such as an Ethernet port, a wireless transceiver, an infrared (IR) port, or the like. Using the communications component 18, the amusement device 10 may communicate with other devices or file servers, access the Internet, communicate over wide area networks (WANs) or local area networks (LANs), or the like. For example, a first amusement device 10-1, which may be comprised of the amusement device 10, may connect with a second amusement device 10-2 (FIGS. 9A and 9B) using the communications component 18. The second amusement device 10-2 optionally includes all of the same components and features as the first amusement device 10-1. The communications component 18 is preferably connected to the controller U1 and through the controller U1 to the memory U2.

The amusement devices 10 preferably include an operating mode and a setup mode. When the operating mode is selected, a player or user is selectively permitted to access the application programs. When the setup mode is selected, the owner/operator is permitted to make system setup adjustments. To switch from the operating mode to the setup mode, a mode selector pushbutton (hardware not shown) is provided that is typically concealed from the players. The mode selector pushbutton may be implemented as a hidden software feature, but preferably the mode selector pushbutton is a simple pushbutton that is disposed inside a housing of the amusement devices 10.

The amusement device 10 may connect with other devices in order to improve the game play experience. Specifically, the amusement device 10 may retrieve a player's player account data in order to track and display the player's game scores in accordance with the preferred embodiments of this invention.

Figure 3:
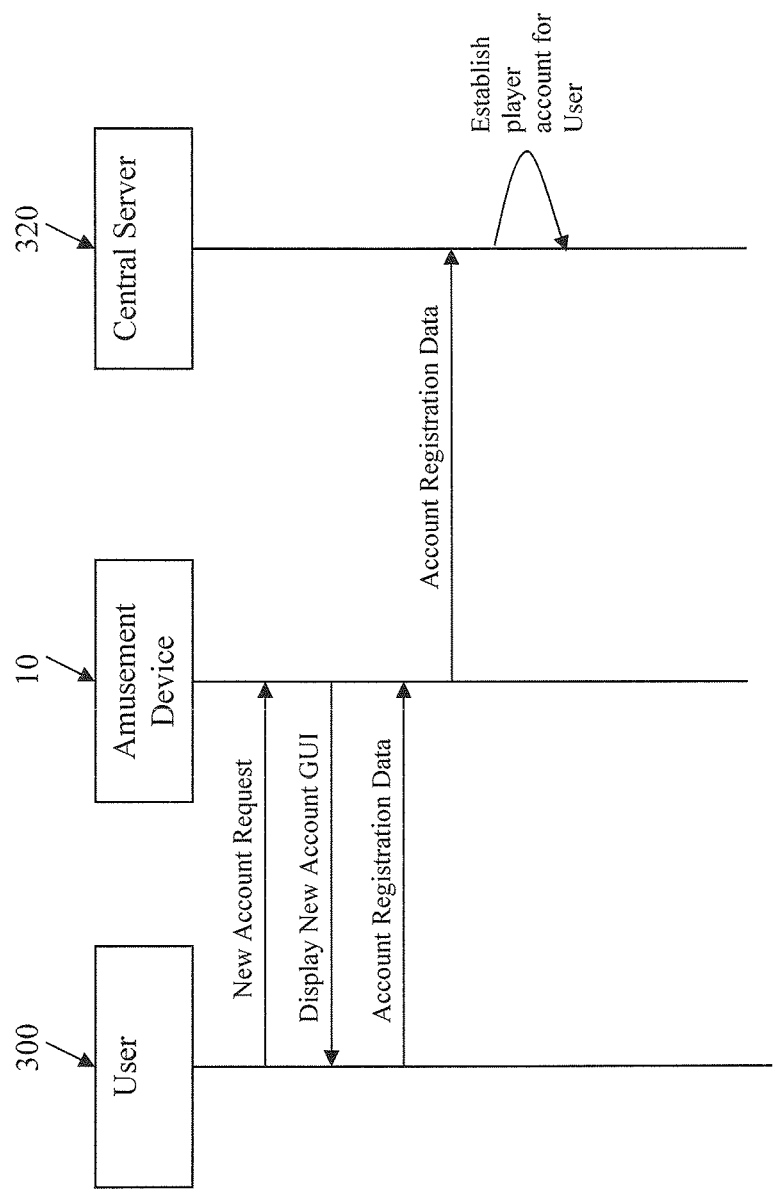
FIG. 3 is a sequence diagram illustrating steps for registering a player's account with a central server in accordance with a preferred embodiment of the present invention.

Referring to FIG. 3, a sequence diagram illustrating steps for registering a player account with a central server 320 is shown. The preferred amusement device 10 connects with the central server 320, preferably over a network (not shown). The player 300 initiates a new account creation process with the amusement device 10. The player 300 is any person interested in utilizing the features of the amusement device 10. The amusement device 10 has a pre-stored new account creation graphical user interface ("GUI") that is displayed to the player 300 on the touchscreen display 12. In an alternate embodiment, the amusement device 10 may request the new account creation GUI from the central server 320.

The player 300 inputs account registration data guided by the new account creation GUI using the touchscreen display 12 or an alternate input device such as a keyboard, mouse, trackpad or the like. Account registration data preferably includes log-in information such as a display name or e-mail address and password, as well as personal identification information such as full name, address, credit card information and the like. The amusement device 10 receives the account registration data from the player 300 and transfers the data to the central server 320. Optionally, the amusement device 10 may store portions of the registration information in memory U2. The central server 320 receives the account registration data and establishes a player account for the player. The account information is stored in a memory (not shown) associated with central server 320. Once the player's player account is established, the account may be accessed from any amusement device 10, 10-1, 10-2, 10-3, 10-4 of the plurality of amusement devices 10-1, 10-2, 10-3, 10-4 within an amusement system 1000 (FIGS. 9A and 9B). That is, the player account may be accessed from any amusement device 10 capable of communicating with the central server 320, a central communication hub 22, a local server 22 or the like. For purposes of the preferred embodiments of the present invention, the central communication hub 22, a local server 23 and/or like components may operate in the manner of the central server 320 that connects various amusement devices 10-1, 10-2, 10-3, 10-4 in the amusement system 1000. Further, the player account may be managed over the Internet by accessing a website of the amusement system 1000. Thus, whenever the player 300 logs into the player account at any amusement device 10 within the amusement system 1000, the player's game scores are tracked and stored in the player's player account on the central server 320. The amusement system 1000 preferably accommodated a plurality of users or players and tracks or stores relevant information for the plurality of users in individual player accounts 400, 500.

Figure 4:
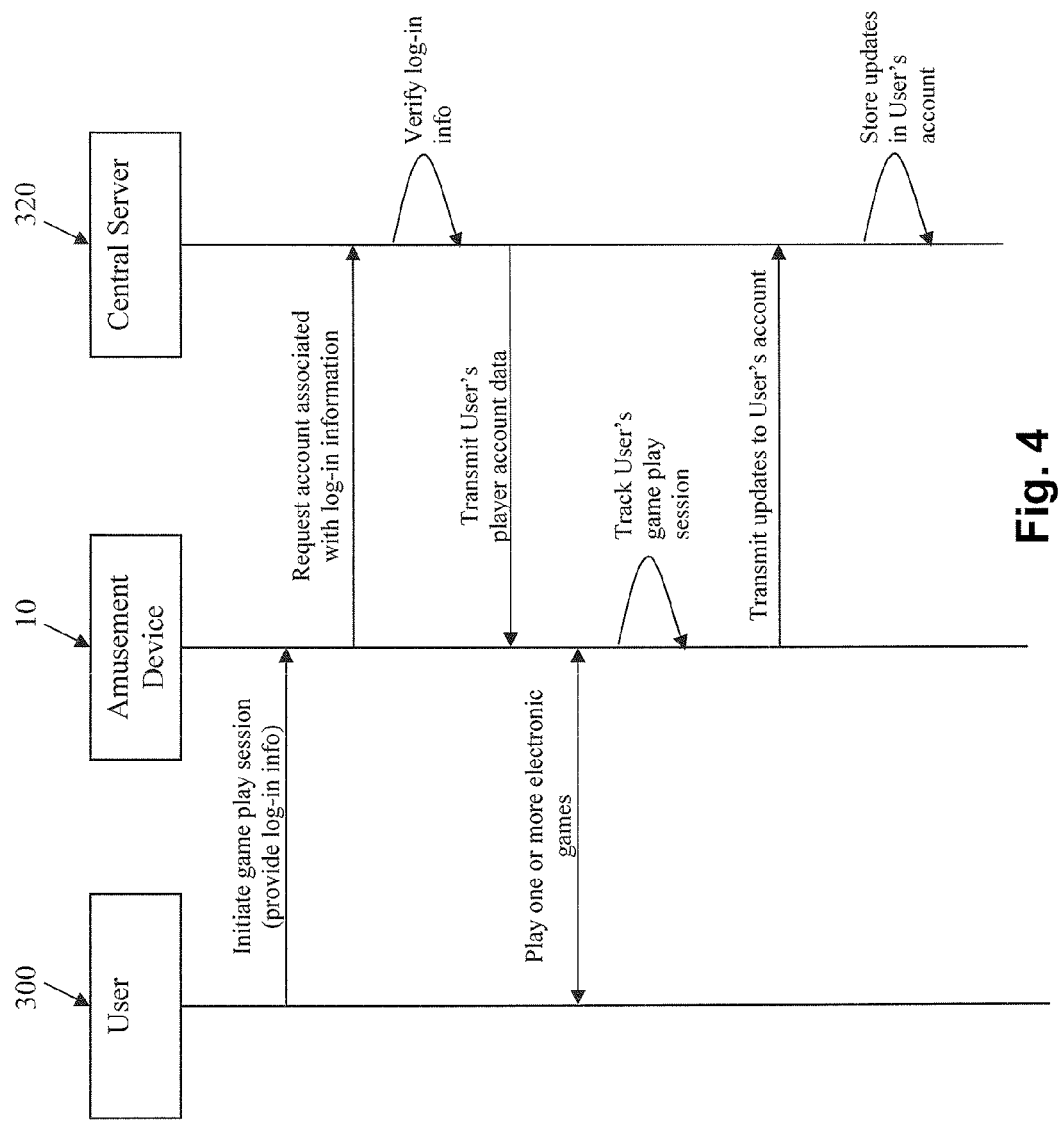
FIG. 4 is a sequence diagram illustrating steps for retrieving, tracking and updating a player's game score in a player account in accordance with a preferred embodiment of the present invention.

Referring to FIG. 4, a sequence diagram illustrating steps for retrieving, tracking and updating a player's game score in a player account is shown. The player 300 initiates a game play session with one of the amusement devices 10, 10-1, 10-2, 10-3, 10-4 by providing log-in information associated with the player account of player 300. The log-in information is provided by the player 300 entering at least a user name and password via the touchscreen display 12. Alternatively, log-in information may be provided by the player 300 inserting a player card storing identification information associated with the player's player account or by transmitting the log-in information from a portable device over a communication interface such as Bluetooth, Near Field Communication ("NFC"), Infrared ("IR") and the like. Various other techniques for providing log-in information to a computing device are known to those skilled in the art and are within the scope of this invention. Once the log-in information is received by the amusement device 10, a request for player account data associated with the player 300 is transmitted from the amusement device 10 to the central server 320. The request includes the log-in information to identify the necessary player account. The central server 320 verifies the received log-in information, determines the player account associated with the player 300 and transmits at least a portion of the player account data and/or the player account 400, 500 (FIG. 10) to the amusement device 10.

Upon receiving the player account data of player 300, the game play session is established. The player 300 may select and play any of the electronic games stored by the amusement device 10, 10-1, 10-2, 10-3, 10-4. The amusement device 10, 10-1, 10-2, 10-3, 10-4 tracks the game play session, recording scores achieved by the player 300. The achieved scores, as well as any other identifying information such as the game played are stored in the memory U2 of amusement device 10, 10-1, 10-2, 10-3, 10-4. Periodically, the amusement device 10, 10-1, 10-2, 10-3, 10-4 transmits the achieved scores to the central server 320. The central server 320 analyzes the received score updates, determines whether any of the scores are best scores and stores the updated scores in the player's player account. For example, the central server 320 may receive first score update information associated with an account of a first player and compare the first score update information, which may include a first attained high score, with stored first best score information to determine if the first player exceeded a previously high score. If the first attained high score is greater than the first high score stored in the central server 320, the first high score is replaced by the first attained high score, which becomes the new first high score. In one embodiment, all player scores are transmitted to central server 320 and saved in the individual player account at the central server 320. In another embodiment, the amusement device 10, 10-1, 10-2, 10-3, 10-4 may determine whether an achieved score is a best score and only transmit the best score or scores of the particular gaming session to central server 320. The updated player account for the player 300 may now be accessed from any other amusement device 10, 10-1, 10-2, 10-3, 10-4 capable of retrieving player account data from central server 320. The updated player account preferably includes updated best score information for electronic games previously played by the player 300 on any amusement device 10, 10-1, 10-2, 10-3, 10-4 in the amusement system 1000.

After the player 300 or first player 300 plays the electronic games and the best score or scores of the particular gaming session is transmitted to the central server 320, a subsequent or second player 300 having a second player account may commence a game session at the amusement device 10, 10-1, 10-2, 10-3, 10-4. During the game session, at the conclusion of the game session or whenever communication is established between the amusement device 10, 10-1, 10-2, 10-3, 10-4 and the central server 320, the amusement device 10, 10-1, 10-2, 10-3, 10-4 preferably transmits and the central server 320 receives second score update information associated with the second player account. The second score update information is preferably compared with second best score information associated with the second player account stored in the central server 320. The second best score information is updated if the second score update information includes information that requires updating of the second best score information stored in the central server 320.

In many electronic games, the best score is a score that is higher than any previously-recorded attained score for the electronic game being played. However, in some electronic games, such as golf games, the best score is a score that is lower than any previously-recorded attained score for the electronic game being played. In yet other games, such as head-to-head games, the best score is an overall record of the player in all matches for that game.

Figure 5:
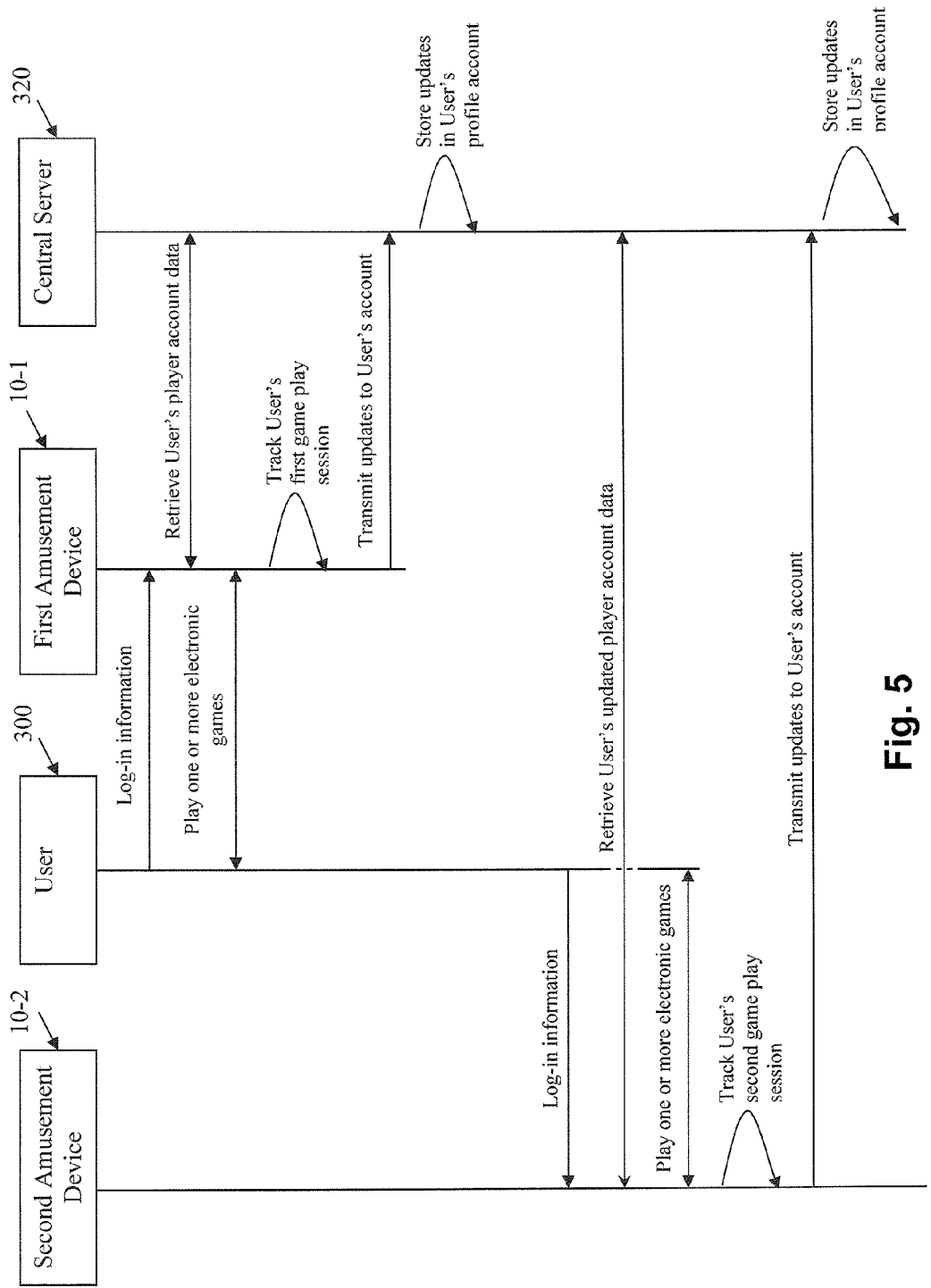
FIG. 5 is a sequence diagram illustrating steps for retrieving, tracking and updating a player's player account from multiple amusement devices in accordance with a preferred embodiment of the present invention.

Referring to FIG. 5, a sequence diagram illustrating steps for retrieving, tracking and updating a player account at various times from multiple amusement devices is shown. In a first game play session, the player 300 logs in to the first amusement device 10-1. The first amusement device 10-1 retrieves the player's player account data from the central server 320, as discussed with reference to FIG. 4 above. The player 300 plays one or more electronic games on the first amusement device 10-1. The first amusement device 10-1 tracks the player's first game play session and transmits updates to the central server 320 for storing in the player's player account. The updated player account is stored by the central server 320 for access from other amusement devices 10, such as the second amusement device 10-2, in the future.

At a later time, the player 300 establishes a second game play session at the second amusement device 330 by providing the player's log-in information to the second amusement device 10-2. Again, the second amusement device 10-2 retrieves the player's updated player account data from the central server 320 using the technique described with respect to FIG. 4 above. Once the player account data of the player 300 has been retrieved, the player 300 plays one or more electronic games on the second amusement device 10-2. The second amusement device 10-2 tracks the second game play session and transmits updates relating to the player's game play session to the central server 320. The central server 320 then stores the updates in the player's profile account.

Figure 6:
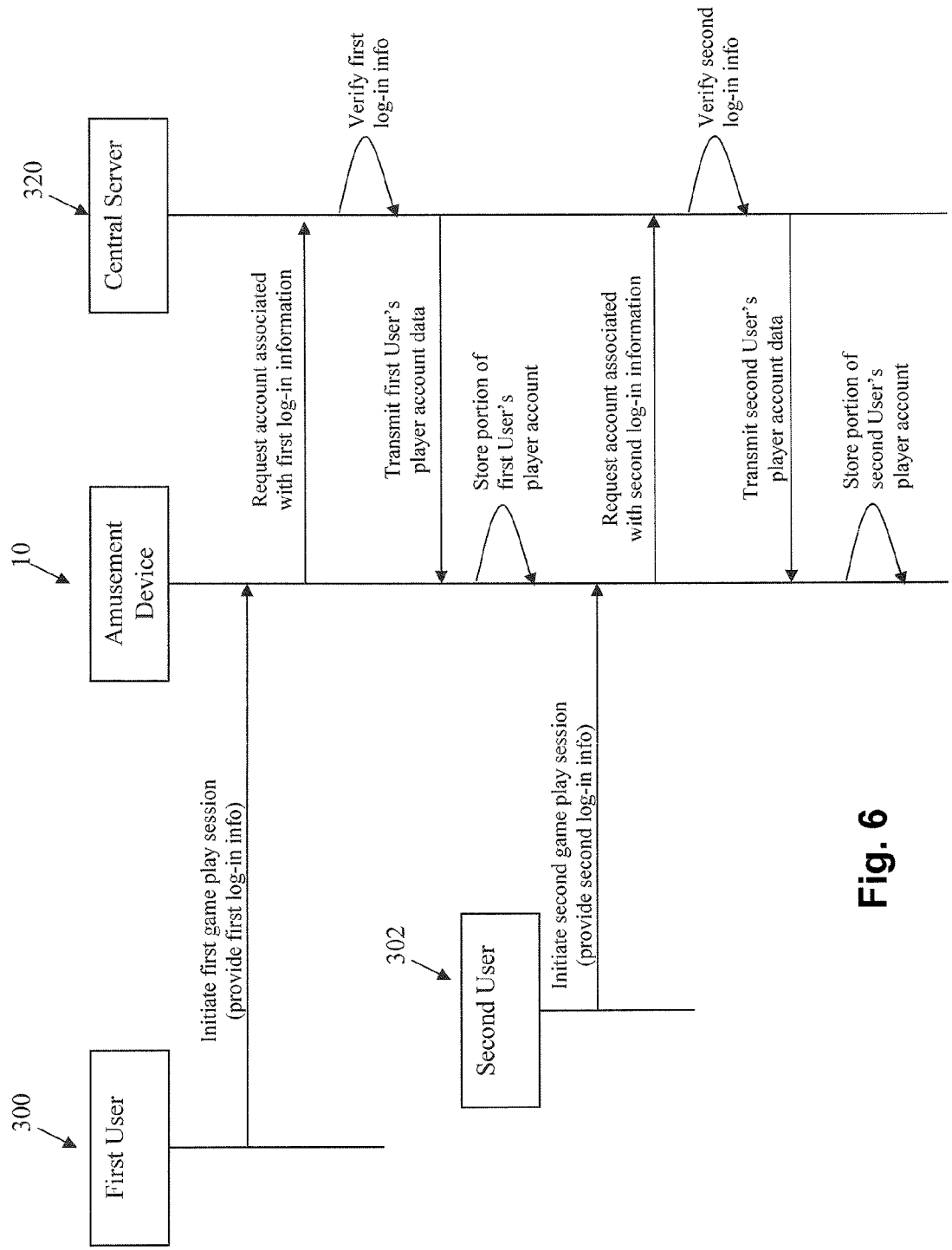
FIG. 6 is a sequence diagram illustrating steps for retrieving and storing portions of player accounts by an amusement device in accordance with a preferred embodiment of the present invention.

Referring to FIG. 6, a sequence diagram illustrating steps for retrieving and storing portions of player accounts by an amusement device is shown. A first player 300 initiates a first game play session by providing first log-in information to the amusement device 10. The amusement device 10 requests player account data associated with the first player 300 by providing the first log-in information to the central server 320. The central server 320 verifies the received first log-in information associated with the first player and the first player's player account and transmits the first player's 300 player account data to the amusement device 10. The amusement device 10 stores at least a portion of the first player's player account data in the memory U2 even after the first player 300 has ended the first game play session by logging out of the amusement device 10. The first player's player account data is also preferably stored in the central server 320. When a second player 302 establishes a second game play session by providing second log-in information, the amusement device 10 requests the second player's 302 player account data by transmitting the second log-in information to the central server 320. The central server 320 verifies the second log-in information and transmits the second player's 302 player account data to the amusement device 10. The amusement device 10 stores at least a portion of the second player's 302 player account data in the memory U2 even after the second player 302 has ended the second game play session by logging out of the amusement device 10. The amusement device 10 preferably maintains player account data for a subgroup of all player accounts stored by the central server 320. As a result, when a network outage occurs making it impossible for the amusement device 10 to retrieve updated player account data from central server 320, players that have previously logged on to the central server 320 through the amusement device 10 retain some player account functionality.

Figure 7:
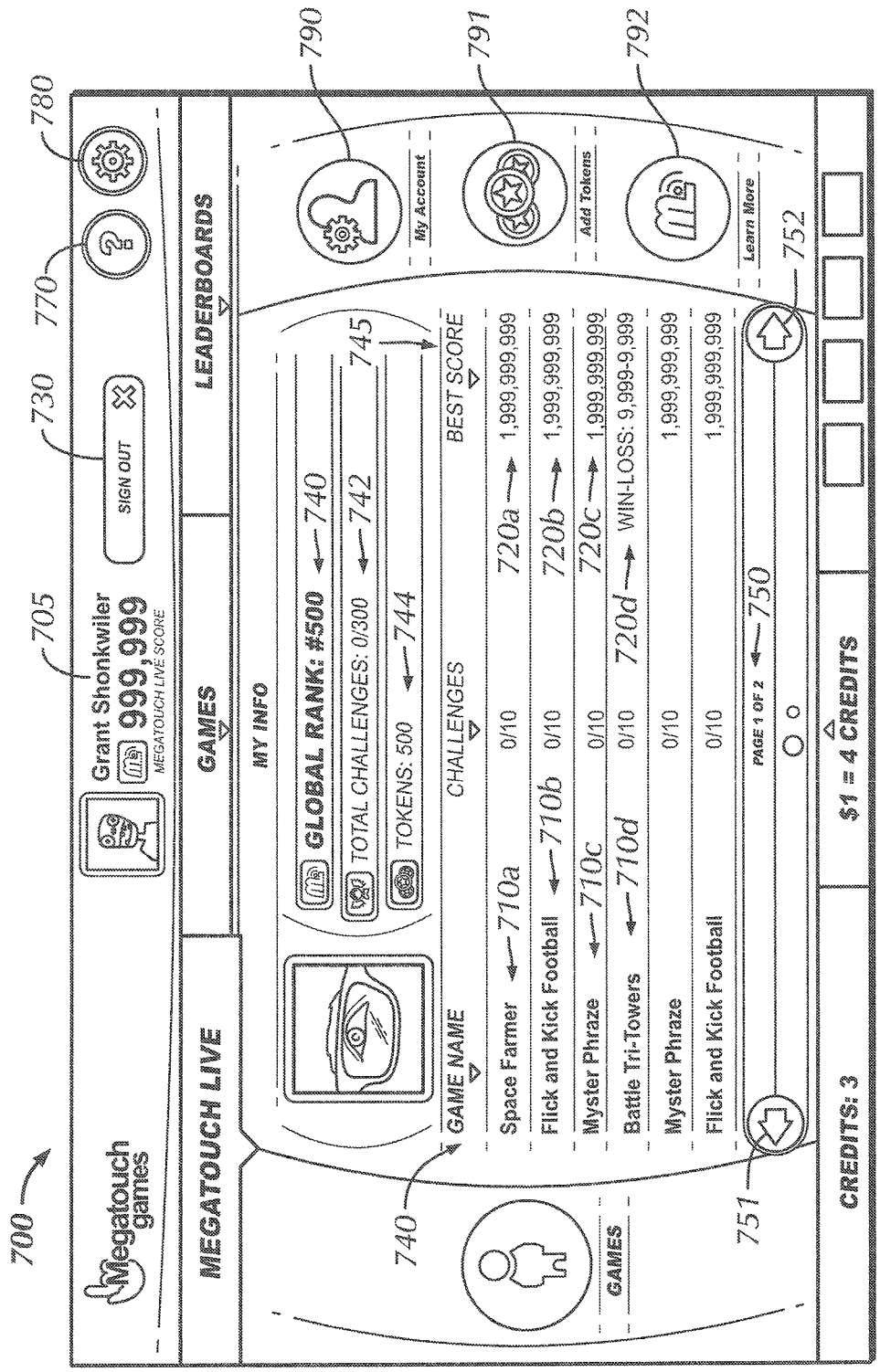
FIG. 7 is a screenshot presenting a player's account overview screen in accordance with a preferred embodiment of the present invention.

Referring now to FIG. 7, a screenshot presenting an account overview screen 700 for the player's player account is shown. The overview screen 700 is preferably shown on the display 12, which is preferably the touchscreen display 12 permitting the players 300, 302 to interact with the account overview screen 700. The player account overview screen 700 is specific to a logged-in player 705, which may be either one of the first and second players 300, 302 or other players (not shown), and provides a game listing 740, which is generally an overview of games the player 300, 302 has played and the player's best scores for those respective games, which are displayed in a best score listing 745, the game listing 740 and best score listing 745 are arranged such that the best score for the particular game is arranged adjacent to the name of the game in the game listing 740.

The account overview screen 700 of the preferred embodiment shown in FIG. 7 includes the game listing 740 showing a listing of four (4) electronic games 710a -710d (SPACE FARMER 710a, FLICK AND KICK FOOTBALL 710b, MYSTERY PHRAZE 710c and BATTLE TRI-TOWERS 710d) playable on the amusement device 10. Each of the electronic games 710a-710d has a corresponding best score or lifetime win-loss record 720a-720d for the player 705, depending upon the type of game. The best/high scores or lifetime win-loss records for games SPACE FARMER 710a, FLICK AND KICK FOOTBALL 710b and MYSTER PHRAZE 710c are presented as the maximum number of points accumulated by the player 705 during a single game play session. The best/high score or lifetime win-loss record for such an electronic game is updated whenever the player attains a higher score for the respective game or whenever a user or player completes a win-loss game so that a win or a loss is added to the lifetime win-loss record. Thus if the user's player account includes a best score of ten thousand (10,000) points for SPACE FARMER 710a and the player attains a score of twenty thousand (20,000) during the next play of the game, which is transmitted to the central server 320 as update information with the new high score, the player account is updated so that the best/high score for SPACE FARMER 710a is shown as twenty thousand (20,000) on the account overview screen 700. The lifetime win-loss record for the multiplayer electronic game BATTLE TRI-TOWERS 710d is presented as the player's lifetime win-loss record for the game. For such a battle mode game, the overall record is shown as the lifetime win-loss record 720d and is updated each time the player completes a head-to-head play of the respective game.

In addition to the best score information, the account overview screen 700 provides the player's Global Rank 740 within the amusement device network. That is, the global rank 740 is the player's overall ranking among all players having player accounts in the amusement system. The Global Rank 740 may be utilized for the maximum points-type games, as well as the head-to-head type games. For example, the player 300 may be ranked based on their win percentage in the head-to-head games and by total number of points in the maximum points-type games. The account overview screen 700 additionally includes buttons for "My Account" 790, allowing the player to change account settings: "Add Tokens" 791, allowing the player to purchase virtual currency; and "Learn More" 792, allowing the player to obtain additional information about the playable system. A page indicator 750 represents the game screen the player is viewing and the total number of available game screens. Additional game screens may be viewed by pressing a left arrow 751 or a right arrow 752. The account overview screen 700 further includes a total challenges indication 742 and a number of tokens indication 744. The number of tokens indication 744 provides an indication to the player 300 of the number of tokens available to the player 300.

Figure 8:
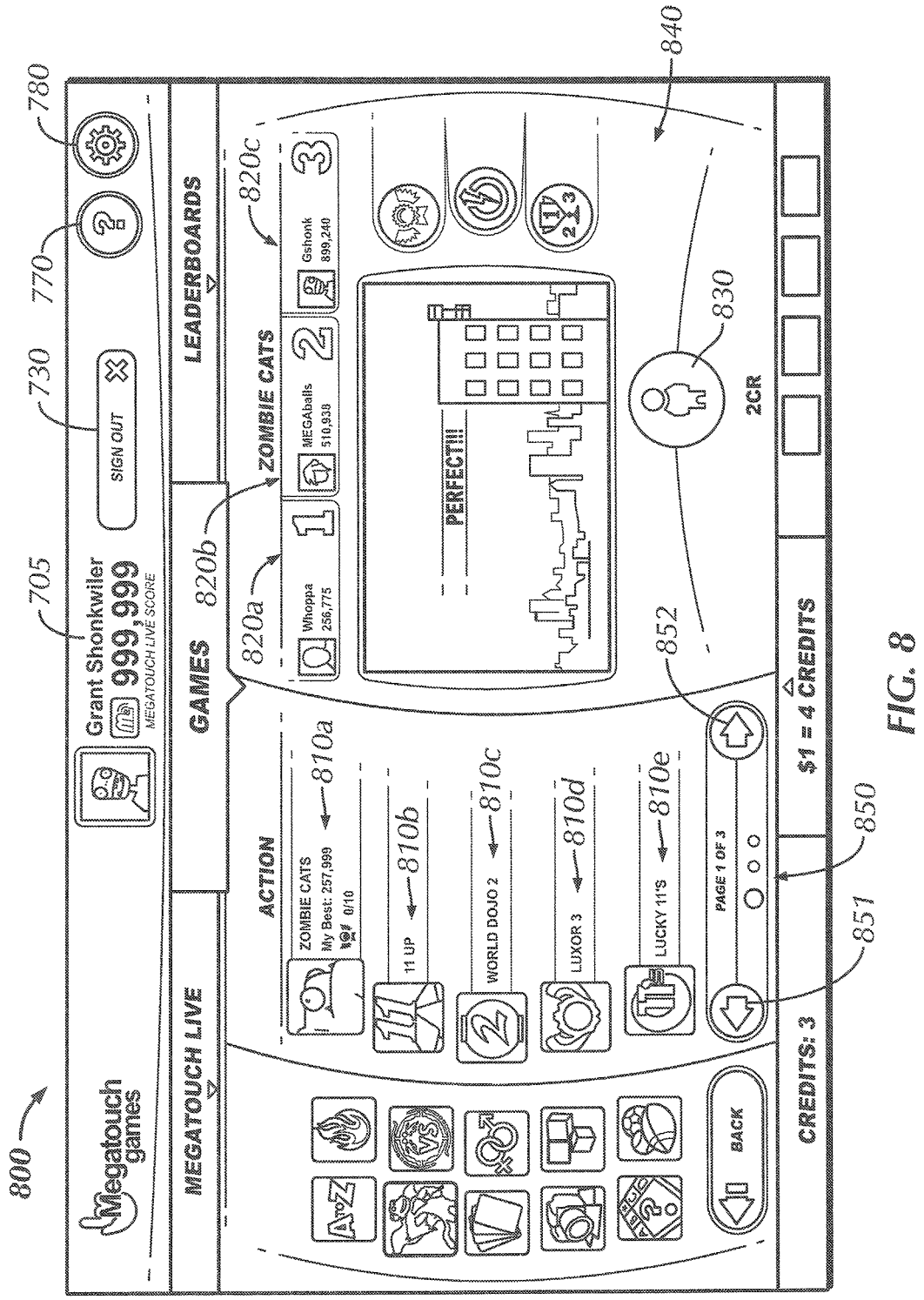
FIG. 8 is a screenshot presenting a game information screen in accordance with a preferred embodiment of the present invention.

Referring to FIG. 8, a screenshot presenting a game information screen 800 in accordance with a preferred embodiment of the present invention is shown. The game information screen 800 is specific to the logged-in player 705 and provides information for a particular electronic game selected by the player. The game information screen 800 is preferably displayed on the display 12 of the amusement device, which is preferably the touchscreen display permitting touch interaction between the player 300 and the game information screen 800. The game information screen 800 preferably includes a listing of electronic games 810a-810e (ZOMBIE CATS 810a, 11 UP 810b, WORD DOJO 2 810c, LUXOR 3 810d, LUCKY 11'S 810e) playable by the player on a logged-in amusement device 10. The electronic game ZOMBIE CATS 810a has been selected in the game information screen 800 of FIG. 8. The player's best score is displayed for the selected electronic game (e.g., the player's best score for ZOMBIE CATS 810a is displayed as 257,999). That is, in all plays of ZOMBIE CATS 810a, the logged-in player's highest score is two hundred fifty-seven thousand nine hundred ninety-nine (257,999). In addition to the player's best score, the game information screen 800 displays the overall top scores and corresponding players 820a -820c for the selected electronic game and a preview screenshot 840 of the game. A play button 830 is displayed for beginning a play of the selected game 810a. A page indicator 850 represents the game screen the player is viewing and the total number of available game screens. Additional game screens may be viewed by pressing a left arrow 851 or a right arrow 852.

Both the account overview screen 700 and the game information screen 800 include account management buttons. Specifically, a help button 770 and a settings button 780 are found in the upper right corner of the screens. The account overview screen 700 and the game information screen 800 also include a "sign out" button 730 that allows the player to disconnect from the gaming session so that the player's account cannot be accessed by the subsequent player.

If the player desires, the player's best scores may be broadcast to friends or other competitors in a variety of ways. When the player wishes to broadcast his or her score, the score may be broadcast on one or more leaderboards maintained by the central server 320. The player account may also be linked to one or more social network profiles of the player. The player may choose to publicize a best score for a particular game to friends on social networks such as TWITTER, FACEBOOK and GOOGLE+. In that case, the player's best score is communicated to the social network selected by the player through an Application Programming Interface ("API") provided by the selected social network and displayed on the player's profile within the selected social network. The central server 320 preferably receives a prompt from the player, such as through inputs or contacts at the touchscreen video display 12A, 12B, 12C, requesting that the player's best score or other information related to the game is communicated to the social network. The central server 320 subsequently transmits the best score or other information to the social network.

FIG. 9A illustrates schematically various embodiments of implementing the amusement system 1000 including one or more amusement devices 10, such as the first amusement device 10-1, the second amusement device 10-2, a third amusement device 10-3 and a fourth amusement device 10-4, and the central server 320. A first gaming location 8a may, for example, house the first, second and third amusement devices 10-1, 10-2, 10-3 that may each be individually in communication with the central server 320. The player account data is preferably received by the amusement devices 10-1, 10-2, 10-3 from the central server 320 over a LAN or a WAN such as the Internet as described above. The central server 320 is typically geographically remote from the amusement devices 10-1, 10-2, 10-3, but is not so limited and may be located nearly anywhere as long as the central server 320 is able to perform the preferred functions of the central server 320.

The first gaming location 8a may also have a central communication hub 22, enabling communication between all of the first, second and third amusement devices 10 housed at the first gaming location 8a and in communication with the central server 320. The central server 320 may also be in communication with a fourth amusement device 10-4, which is not connected to the central communication hub 22, but is directly in communication with the central server 320. The fourth amusement device 10-4 is located at a second gaming location 8b, remote from the first gaming location 8a, in this preferred embodiment. The central communication hub 22 provides a certain amount of back-up to the central server 320, particularly in situations where the central server 320 malfunctions or communication between the central server 320 and the central communication hub 22 are interrupted. The central communication hub 22 preferably stores some player information such that the amusement devices 10-1, 10-2, 10-3 may be operated without contact with the central server 320. In addition, the central communication hub 22 permits a manager or operator at the first gaming location 8a to configure the amusement devices 10-1, 10-2, 10-3 in a unique way for the enjoyment of the players at the first gaming location 8a, without impacting the operation of the fourth amusement device 10-4 at the second gaming location 8b. The central communication hub 22 preferably operates as a central server 320 with respect to the first, second and third amusement devices 10-1, 10-2, 10-3 in the preferred embodiment shown in FIG. 9A.

In another alternative arrangement, as shown in FIG. 9B, the gaming location 8 may house its own local server 23, which performs all of the functions listed above with respect to the central server 320 for all of the local amusement devices 10, including the first, second and third amusement devices 10-1, 10-2, 10-3, in the preferred embodiment shown in FIG. 9B. In the case where a device operator owns a large number of amusement devices 10, the local server 23 or the central communication hub 22 may be a central point for maintaining player accounts and tracking best score information for all amusement devices 10 at the gaming location 8. The local server 23 may be housed in the gaming location 8 and need not be remote to every amusement device 10.

Figure 9:
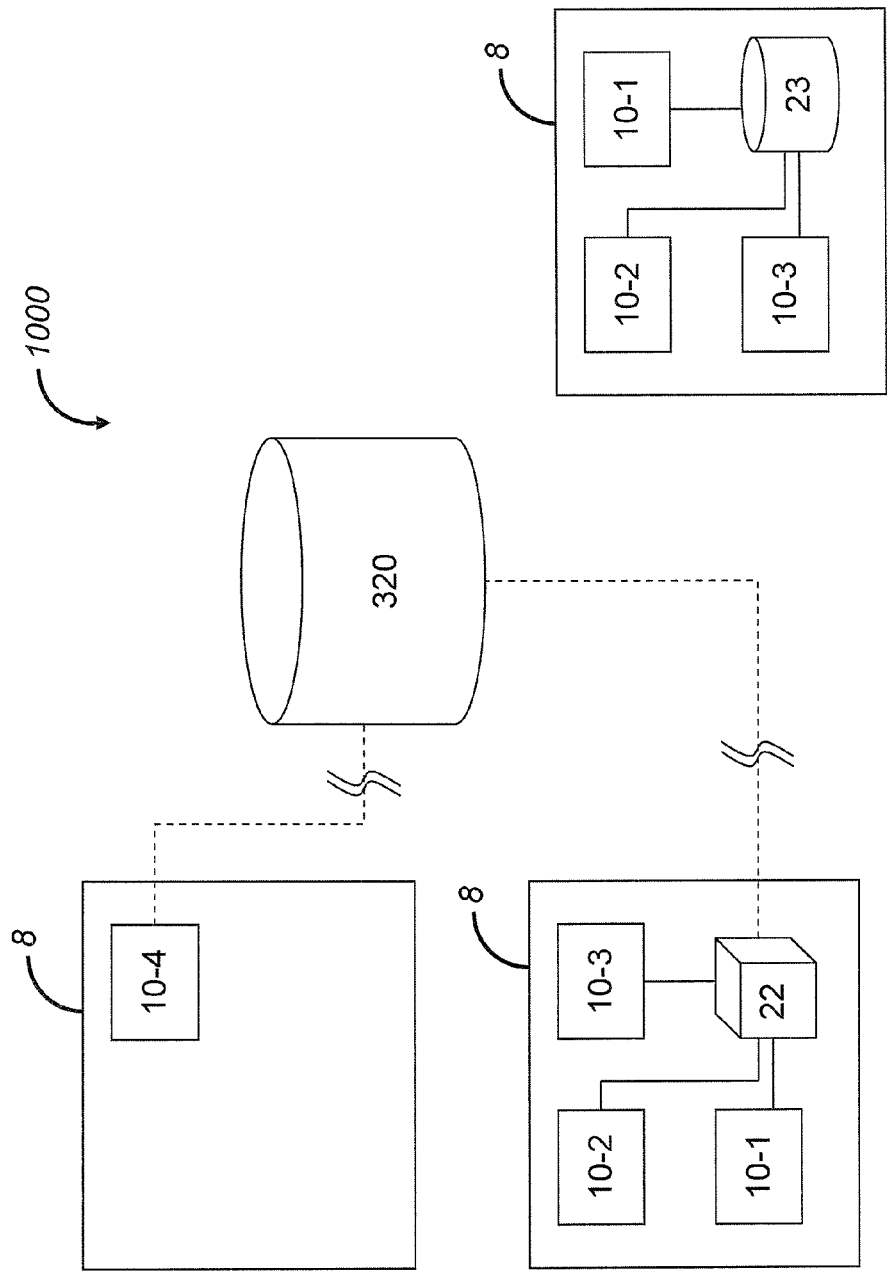
FIG. 9A is a schematic block diagram of various configurations of an amusement device system in accordance with a preferred embodiment of the present invention.
FIG. 9B is a schematic block diagram of a gaming location having a local server in accordance with a preferred embodiment of the present invention.
Figure 10:
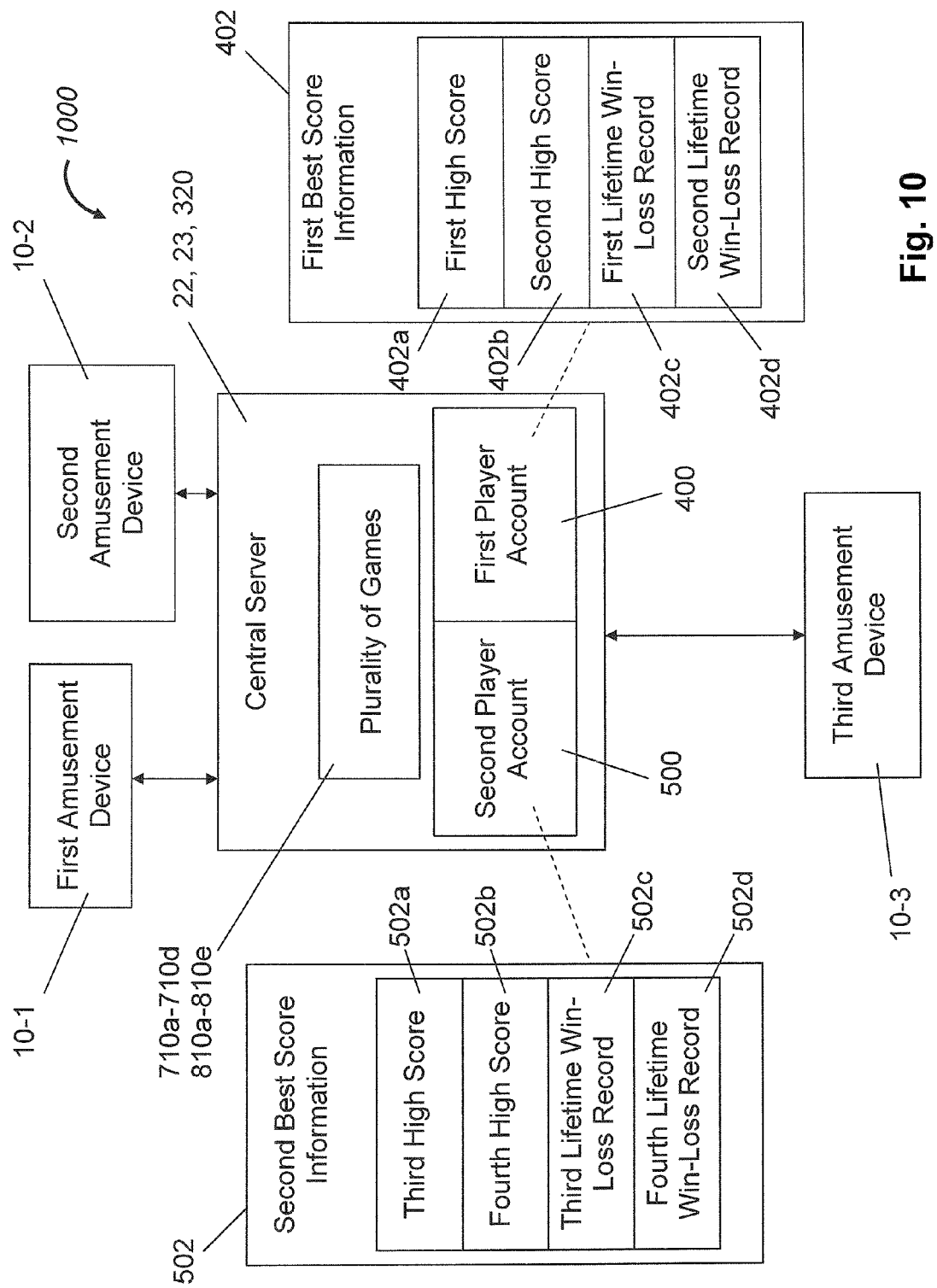
FIG. 10 is a schematic block diagram of an amusement device system in accordance with one of the preferred embodiments of the present invention.

Referring to FIGS. 9A-10, the central server 320, central communication hub 22 and/or local server 23 preferably maintain a plurality of player accounts, including a first player account 400 and a second player account 500. There is preferably the same number of player accounts as there are authorized players or players for the particular preferred amusement system 1000 and the amusement system 1000 preferably stores these player accounts in the central server 320, central communication hub 22, local server 23 and/or the individual amusement devices 10. The first player account 400 is preferably associated with the first player and includes information related to the first player, such as log-in information, payment information, score information, game preferences and like information that may be associated with the first player. The second player account 500 is preferably associated with the second player and includes similar information related to the second player. In the preferred embodiment, the first player account 400 includes first best score information 402 and the second player account 500 includes second best score information 502.

The preferred first best score information 402 includes a first high score 402a, which is the first player's high score for a first maximum points game, a second high score 402b, which is the first player's high score for a second maximum points game, a first lifetime win-loss record 402c, which is the first player's lifetime win-loss record for a first head-to-head game, and a second lifetime win-loss record 402d, which is the first player's lifetime win-loss record for a second head-to-head game. The preferred second best score information 502 includes a third high score 502a, which is the second player's high score for the first maximum points game, a fourth high score 502b, which is the second player's high score for the second maximum points game, a third lifetime win-loss record 502c, which is the second player's lifetime win-loss record for the first head-to-head game, and a fourth lifetime win-loss record 502d, which is the second player's lifetime win-loss record for the second head-to-head game. The central server 320, central communication hub 22, local server 23 and/or the individual amusement devices 10-1, 10-2, 10-3, 10-4 preferably store and maintain high scores and/or lifetime win-loss records for each of the plurality of games 710a-710d, 810a, 810e for each of the plurality of users and/or players. However, the amusement system 1000 is not so limited and the best score information 402, 502 may only be maintained for active users and/or players, may only include high score and/or win-loss information related to the selected ones of the plurality of games 710a-710d, 810a-810e that the individual user or player has played or include other various combinations of high score and/or win-loss records for the individual players and/or users.

Referring to FIGS. 7 and 10, in the preferred embodiment, the central server 320 compares the first high score 402a associated with the first maximum points game and the first player or user with high scores for all of the plurality of users or players for the same first maximum points game to determine a first global rank 740 for the first user. The first global rank 740 is preferably displayed on the account overview screen 700 when the user or player selects the first maximum points game, which may be any of the plurality of games that are based on attaining a maximum number of points during game play.

In the preferred embodiment, the first lifetime win-loss record 402c includes a first total win value and a first total loss value. After the user or player plays the particular head-to-head game, such as the Battle Tri-Towers game 710d, the amusement device records first score update information, which includes a first attained win value and a first attained loss value. Each play session may result in multiple plays of the head-to-head game and a cumulative number in both the first attained win and loss values. The first attained win value is preferably added to the first total win value and the first attained loss value is preferably added to the first total loss value to replace the previous first lifetime win-loss record with an updated or new first lifetime win-loss record. The update of the player's best score information results in new best score information resulting from updating the values to include the results of the gaming session. The new best score information is preferably stored in the central server 320, but may alternatively be stored in the amusement device 10, the central communication hub 22, the local server 23 and/or the like.

Referring to FIG. 7, the account overview screen 700 preferably includes a game listing 740 of the plurality of electronic games 710a-710d that are available for play or have been played by the user or player. In addition, the account overview screen 700 also preferably includes a best score listing 745 that lists the best score information, such as the first best score information 402 for the first player or the second best score information 502 for the second player, depending upon which one of the plurality of players or users is logged into the selected amusement device 10-1, 10-2, 10-3, 10-4. The plurality of games 710a-710d and best score information 402, 502 are arranged such that the high score or lifetime win-loss record associated with the individual games 710a-710d are aligned or positioned in proximity to each other so that the user or player can track and identify their top scores and lifetime win-loss records for each of the plurality of games 710a-710d.

Referring to FIGS. 7-10, the amusement devices 10 may be connected to their corresponding servers 320, 23 and/or the central communication hub 22 through conventional communication configurations, such as a LAN, WAN, or the like. In one preferred embodiment, the amusement device 10 may connect to the central server 320 via the Internet. It is thus understood by those skilled in the art that the amusement system 1000 is not limited to the arrangements described above, and may include any configuration wherein a player account for obtaining playable credits is maintained. Each of the first, second, third, fourth amusement devices 10-1, 10-2, 10-3, 10-4 and any additional amusement devices 10 associated with or connected to the amusement system 1000 preferably include the video display 10, the input component 14, the communications component 18, the controller U1 and the memory U2.

The amusement device 10 may also include other functionality and features such as music jukebox, video jukebox, multimedia player, Internet browsing, broadcast media viewing, time based rental mode, non-prize tournaments, prize-based tournaments, head-to-head competitions, prize-based lotteries, ticket dispensing, prize dispensing, debit/credit card charging, phone card dispensing, e-mail, photography, placing customer orders, communicating with other amusement devices, and the like.

The amusement device 10 may also provide for remote or local access for accounting and/or bookkeeping purposes. The amusement device 10 may include a local connector for uploading to a hand-held or portable computer or removable memory for receiving accounting or other data. The amusement device 10 may include accounting and bookkeeping screens accessible by an operator through set up screens and/or through password protection.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A method of tracking electronic game score information for a plurality of players participating in an amusement system, the amusement system comprising at least a first amusement device communicating with a central server over a network, the first amusement device having a video display, a memory storing a plurality of electronic games and a controller, the method comprising:

a) maintaining, by the central server, a plurality of player accounts corresponding to the plurality of players, the plurality of player accounts including a first player account associated with a first player, the first player account including first best score information, the plurality of electronic games including a first maximum points game and a first head-to-head game, the first best score information including a first high score for the first maximum points game and a first lifetime win-loss record for the first head-to-head game;

b) receiving, via the central server, first score update information associated with the first player account;

c) comparing, by the central server, the first best score information with the received first score update information; and d) transmitting, via the central server, a game listing of the plurality of electronic games including the first maximum points game and the first head-to-head game and a best score listing of the first best score information to the first amusement device, the first maximum points game positioned proximate the first high score and the first head-to-head game positioned proximate the first lifetime win-loss record.

2. The method of claim 1, further comprising:
e) receiving, at the central server, a log-in request associated with the first player account from the first amusement device; and
f) transmitting, by the central server, the first best score information stored in the first player account to the first amusement device in response to the log-in request of step (e).

3. The method of claim 1, further comprising:
e) determining, by the central server, whether the first score update information includes a first attained high score for the first maximum points game;
f) identifying, by the central server, the first high score;
g) comparing, with the central server, the first high score with the first attained high score to determine which is greater; and
h) replacing the first high score with the first attained high score in the first player account if the first attained high score is greater than the first high score.

4. The method of claim 1, wherein the first best score information further includes a second high score associated with a second maximum points game and further comprising:
e) determining, by the central server, whether the first score update information includes a second attained high score for the second maximum points game;
f) identifying, by the central server, the second high score;
g) comparing, via the central server, the second high score with the second attained high score to determine which is greater; and
h) replacing the second high score with the second attained high score in the first player account if the second attained high score is greater than the second high score.

5. The method of claim 1, wherein the first best score information includes the first high score associated with the first maximum points game, a second high score associated with a second maximum points game, the first lifetime win-loss record associated with the first head-to-head game and a second lifetime win-loss record associated with a second head-to-head game.

6. The method of claim 5, wherein the plurality of player accounts includes a second player account associated with a second player, the second player account having second best score information, the second best score information includes a third high score associated with the first maximum points game, a fourth high score associated with the second maximum points game, a third lifetime win-loss record associated with the first head-to-head game and a fourth lifetime win-loss record associated with the second head-to-head game.

7. The method of claim 1, wherein the first score update information includes a first attained win value and a first attained loss value, the first lifetime win-loss record includes a first total win value and a first total loss value and further comprising:
e) adding the first attained win value to the first total win value; and
f) adding the first attained loss value to the first total loss value.

8. The method of claim 1, further comprising;
e) receiving, by the central server, second score update information associated with a second player account from a second amusement device;
f) comparing, by the central server, second best score information associated with the second player account with the received second score update information, the second best score information including a third high score and a third lifetime win-loss record; and
g) transmitting, via the central server, the game listing of the plurality of electronic games including the first maximum points game and the first head-to-head game and a best score listing of the second best score information to the second amusement device, the first maximum points game positioned proximate the third high score and the first head-to-head game positioned proximate the third lifetime win-loss record on a second display of the second amusement device.

9. The method of claim 1, further comprising:
e) receiving, by the central server, a prompt from the first amusement device to display the first high score to a social network; and
f) transmitting, from the central server, a command to display the first high score to the social network.

10. A method of tracking first best score information of a first player for a plurality of electronic games played by the first player on a plurality of amusement devices including a first amusement device of a plurality of amusement devices connected via a central server, each of the plurality of amusement devices having a display, a memory and a controller, the method comprising:
a) receiving, by the central server, first log-in information associated with the first player and a first player account from the first amusement device, the first player account stored by the central server;
b) transmitting, by the central server, the first player account to the first amusement device, the first player account including first best score information, the first best score information having a first high score associated with a first maximum points game, a second high score associated with a second maximum points game and a first lifetime win-loss record associated with a first head-to-head game;
c) receiving, by the central server from the first amusement device, an update to the first player account, the update comprising first new best score information generated based on the first player playing one or more of the plurality of electronic games on the first amusement device; and
d) transmitting a command from the central server to the first amusement device to display on a first video display of the first amusement device a game listing of the plurality of electronic games and a first best score listing of the first new best score information, the first high score positioned proximate the first maximum points game, the second high score positioned proximate the second maximum points game and the first lifetime win-loss record positioned proximate the first head-to-head game.

11. The method of claim 10, wherein the plurality of amusement devices includes a second amusement device and further comprising:
 e) receiving, via the central server from the second amusement device, the first log-in information;
 f) transmitting, by the central server to the second amusement device, the first player account;
 g) transmitting a command from the central server to the second amusement device to display on a second video display of the second amusement device a first global rank of the first player for the first maximum points game.

12. The method of claim 11, further comprising:
 h) transmitting a command from the central server to display, on the second video display, the game listing and the first best score listing.

13. The method of claim 10, wherein the first best score information includes a second lifetime win-loss record associated with a second head-to-head game and further comprising:
 e) transmitting a command from the central server to the first amusement device to display, on the first video display, the second head-to-head game in the game listing and the second lifetime win-loss record in the first best score listing.

14. The method of claim 10, further comprising:
 e) receiving, by the central server, a prompt from the first amusement device to display first lifetime win-loss record to a social network; and
 f) transmitting, from the central server, a command to display the first lifetime win-loss record to the social network.

15. The method of claim 14, wherein the first video display is comprised of a touchscreen video display, the prompt of step (e) is based on contact between the first player and the touchscreen video display.

16. An amusement system for tracking game score information over a plurality of amusement devices for a plurality of players including a first player participating in game play, the amusement system comprising:
 a plurality of games available for game play including a first maximum points game and a first head-to-head game;
 a plurality of player accounts associated with the plurality of players including a first player account associated with the first player, the first player account including first best score information, the first best score information including a first high score for the first maximum points game and a first lifetime win-loss record for the first head-to-head game; and
 a central server storing the plurality of electronic games and the plurality of player accounts, the central server configured to:
  (i) receive first score update information associated with the first player account from a first amusement device of the plurality of amusement devices, the first score update information including a first attained high score associated with the first maximum points game, a first attained win value and a first attained loss value;
  (ii) access the first player account; and
  (iii) compare the first score update information with the first best score information including comparing the first attained high score with the first high score and the first attained win and loss values with the first lifetime win-loss record.

17. The amusement system of claim 16, wherein the central server is configured to replace the first high score with the first attained high score when the first attained high score is greater than the first high score.

18. The amusement system of claim 16, wherein the central server is configured to add the first attained win value to a first lifetime win record of the first lifetime win-loss record and the first attained loss value to a first lifetime loss record of the first lifetime win-loss record.

19. The amusement system of claim 16, wherein the central server is configured to receive a log-in request information associated with the first player account, the central server blocking the first player from playing any of the plurality of amusement devices until verification of the log-in request information with stored information of the first player account.

20. The amusement system of claim 16, wherein the central server further stores global rank information related to the first maximum points game, the central server further configured to calculate a first global rank of the first player for the first maximum points game and transmit a command to the first amusement device to display the first global rank on the video display of the first amusement device.

* * * * *